US012638701B2

(12) United States Patent　　　　　(10) Patent No.: US 12,638,701 B2
Tullo　　　　　　　　　　　　　　　　(45) Date of Patent: May 26, 2026

(54) NIGHT-DRIVING GLASSES DEVICE

(71) Applicant: Greg Tullo, Raleigh, NC (US)

(72) Inventor: Greg Tullo, Raleigh, NC (US)

( * ) Notice: Subject to any disclaimer, the term of this patent is extended or adjusted under 35 U.S.C. 154(b) by 321 days.

(21) Appl. No.: 18/467,025

(22) Filed: Sep. 14, 2023

(65) Prior Publication Data

US 2024/0288715 A1　　Aug. 29, 2024

Related U.S. Application Data

(60) Provisional application No. 63/448,449, filed on Feb. 27, 2023.

(51) Int. Cl.
G02C 7/10　　　　　(2006.01)
(52) U.S. Cl.
CPC ................................... G02C 7/105 (2013.01)
(58) Field of Classification Search
CPC ........... G02C 7/105; G02C 7/104; G02C 7/12
USPC ................................. 351/41, 159.01, 159.66
See application file for complete search history.

(56) References Cited

U.S. PATENT DOCUMENTS

| | | | |
|---|---|---|---|
| 4,859,047 A | 8/1989 | Badewitz | |
| 5,252,997 A | 10/1993 | Christenbery | |
| 5,428,409 A | 6/1995 | Silverstein | |
| 6,575,569 B1 | 6/2003 | Castellano | |
| 7,264,352 B2 | 9/2007 | Anthony | |
| 8,192,021 B2 * | 6/2012 | Giraudet ................ | G02C 7/105 |
| | | | 351/159.63 |
| 2003/0147047 A1 * | 8/2003 | Renard .................... | G02C 7/12 |
| | | | 351/159.27 |
| 2011/0141432 A1 * | 6/2011 | Nesty .................... | G02C 7/105 |
| | | | 351/44 |

* cited by examiner

*Primary Examiner* — Tuyen Tra
(74) *Attorney, Agent, or Firm* — Brennan, Manna & Diamond, LLC

(57) ABSTRACT

A night-driving glasses device is provided. The device is comprised of at least one frame with at least one lens. The lens may be comprised of a first area, a second area, and a third area. The lens areas have varying degrees of tint to optimally reduce bright lights or promote clear viewing while driving and using the device. Each tint gradually or sharply attenuates into the next tint to provide a smooth viewing transition.

18 Claims, 6 Drawing Sheets

NIGHT-DRIVING GLASSES DEVICE

CROSS-REFERENCE TO RELATED APPLICATION

The present application claims priority to, and the benefit of, U.S. Provisional Application No. 63/448,449, which was filed on Feb. 27, 2023, and is incorporated herein by reference in its entirety.

FIELD OF THE INVENTION

The present invention relates generally to the field of glasses. More specifically, the present invention relates to a night-driving glasses device with a lens area that can be a plurality of tints that provide a user with enhanced visibility by blocking bright lights while driving. Accordingly, the present disclosure makes specific reference thereto. Nonetheless, it is to be appreciated that aspects of the present invention are also equally applicable to other like applications, devices, and methods of manufacture.

BACKGROUND

When driving a car, truck, motorcycle, bicycle, or other vehicle known in the art at night, it may be difficult to see due to the headlights of oncoming vehicles or traffic lights. Modern vehicles are equipped with bright white or blue headlights that may temporarily blind a driver or reduce their visibility. Additionally, a user driving a low-riding vehicle, such as, but not limited to, a sedan, may be at increased susceptibility to temporary blinding or decreased visibility due to oncoming bright headlights from taller vehicles. Furthermore, reflection and glare from said bright lights may be even more problematic during rain, snow, or other inclement weather. Moreover, the bright white, blue light, reflection, or glare may reduce visibility enough to cause a traffic crash or other accidents.

Therefore, there exists a long-felt need in the art for a device that enhances visibility when faced with oncoming headlights. More specifically, there exists a long-felt need in the art for a night-driving glasses device that significantly reduces the glare of oncoming headlights or fog lights to improve visibility on roadways. Furthermore, there exists a long-felt need in the art for a night-driving glasses device that significantly reduces the glare of oncoming headlights or fog lights to improve visibility on roadways by using tints with an attenuation gradient to shield a user from oncoming bright lights. Moreover, there exists a long-felt need in the art for a night-driving glasses device that significantly reduces the glare of oncoming headlights or fog lights to improve visibility on roadways by using tints with an attenuation gradient to shield a user from oncoming bright lights and areas without tint to provide clear viewing of roadways, signs, lines, and other safety features.

The subject matter disclosed and claimed herein, in one embodiment thereof, comprises a night-driving glasses device. The device is comprised of at least one frame and at least one lens. The frame is comprised of at least one frame arm that allows the device to rest on a user's ears. Additionally, the frame is comprised of at least one nose pad to enhance user comfort. The lens is comprised of at least one lens area, wherein, each lens area has a varying degree of tint. This provides a user with an area to block oncoming bright lights and an area for clearly viewing safety features on a road.

In this manner, the night-driving glasses device of the present invention accomplishes all the foregoing objectives and provides a device that enhances user visibility while driving or riding in any vehicle known in the art. More specifically, the night-driving glasses device reduces the intensity and glare of oncoming lights to increase visibility by applying varying degrees of tints to the lenses. Furthermore, the night-driving glasses device provides a user with multiple lens areas to attenuate bright lights while preserving clear viewing of oncoming signs, lines, and other road safety features.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a night-driving glasses device. The device is comprised of at least one frame that supports at least one lens. Additionally, the frame provides the device with a plurality of shapes and styles, such as, but not limited to, square, round, aviator, full-frame, frameless, etc. The frame of a device may be made from any material known in the art, such as, but not limited to, metal, gliamide, plastic, a combination material, etc.

Moreover, the device is comprised of at least one hinge. The hinge allows at least one frame arm to fold into a frame, making the device more compact for storage. The hinge may be a barrel hinge, spring hinge, interlocking hinge, or any other hinge known in the art. Furthermore, the hinge may be made from any material known in the art, such as, but not limited to, metal, plastic, etc. In one embodiment, at least one frame member pivots around at least one hinge to fold into a frame of a device. In another embodiment, the device is not comprised of a hinge, and a frame arm folds into a frame of a device via a hingeless mechanism.

Additionally, the device is comprised of at least one frame arm. The frame arm secures the device around a user's ears. The frame arm may be any material known in the art, such as, but not limited to, magnesium, stainless steel, plastic, a combination material, etc. In one embodiment, the frame and the frame arm are comprised of the same material. In another embodiment, the frame may be made from any of the said materials, and the frame arm may be made from any other material mentioned above.

Furthermore, the device is comprised of at least one lens. The lens is comprised of a combination of a first area, second area, and third area in different embodiments. Each area has varying degrees of tints to accommodate bright lights or clear viewing. The lens area may be comprised of a grey, green, yellow, amber, blue, or any other tint known in the art. Moreover, the lens may be comprised of any tint category known in the art, such as, but not limited to, 0, 1, 2, 3, 4, etc., wherein the lower the category number, the less tinted the lens is. The lens may also be polarized or non-polarized.

In one embodiment of the night-driving glasses device, the lens is only comprised of a first area. In said embodiment, the first area may be fully tinted with a single tint color and category without a gradient in the tint. In this embodiment, the lens may be used to reduce the bright white light, blue light, reflection, or glare of oncoming traffic lights.

In another embodiment, the lens is comprised of a first area and a second area. The first area may be comprised of a darker tint, such as, but not limited to, category 4, to reduce the bright headlights of oncoming traffic. The second area may be comprised of a lighter tint, such as, but not limited to, category 1 or no tint, to provide a clear viewing of road structures. In one embodiment of a lens with a first area and a second area, there may be a linear gradient to transition from the darker tint to the lighter tint. The linear gradient may be gradual or sharp and may extend horizontally, vertically, or diagonally across the lens. In another embodiment of said lens structure, there may be a non-linear gradient across the lens, serving the same purpose as the linear gradient. Additionally, the darker and lighter tints may be on any side of the lens to provide optimal light reduction and clear viewing.

In another embodiment, the lens is comprised of a first area, a second area, and a third area. In this embodiment, the first area may be the darkest tint to reduce the brightness of headlights. The second area may be an intermediate tint needed to see roadway structures. The third area may be the lightest tint or no tint to accommodate situations when a clear view is needed. Additionally, the gradients between the tints may be gradual or sharp to optimize visibility.

The present invention is also comprised of a method of using the device. First, a device is provided comprised of at least one frame arm, a frame, and at least one lens with a first area and a second area. Then, a user puts a device over their eyes while in a vehicle. Next, a user drives said vehicle while wearing a device. Then, while approaching oncoming traffic with bright lights, a user looks through the first area of a lens to reduce the brightness of said lights. Then, when looking at roadways, lines, signs, etc., a user looks through the second area, for a less tinted view.

The present invention is also comprised of a second method of using the device. First, a device is provided comprised of at least one frame arm, a frame, and at least one lens with a first area, second area, and third area. Then, a user puts a device over their eyes while in a vehicle. Next, a user drives said vehicle while wearing a device. Then, while approaching oncoming traffic with bright lights, a user looks through the first area of a lens to reduce the brightness of said lights. Then, when looking at a road needing intermediate tinting, a user looks through the second area. Then, when needing a clear view of roadways, lines, signs, etc., a user looks through the third area.

Accordingly, the night-driving glasses device of the present invention is particularly advantageous as it increases user visibility while operating, driving, or riding in any vehicle known in the art. Additionally, the night-driving glasses device applies varying degrees of tint to reduce the intensity, reflection, and glare of oncoming lights to improve visibility. Moreover, the device comprises multiple lens areas to accommodate optimal visibility when faced with bright lights or when needing a clear view of roadways, signs, lines, and other road safety features. In this manner, the night-driving glasses device provides a solution for driving at night.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
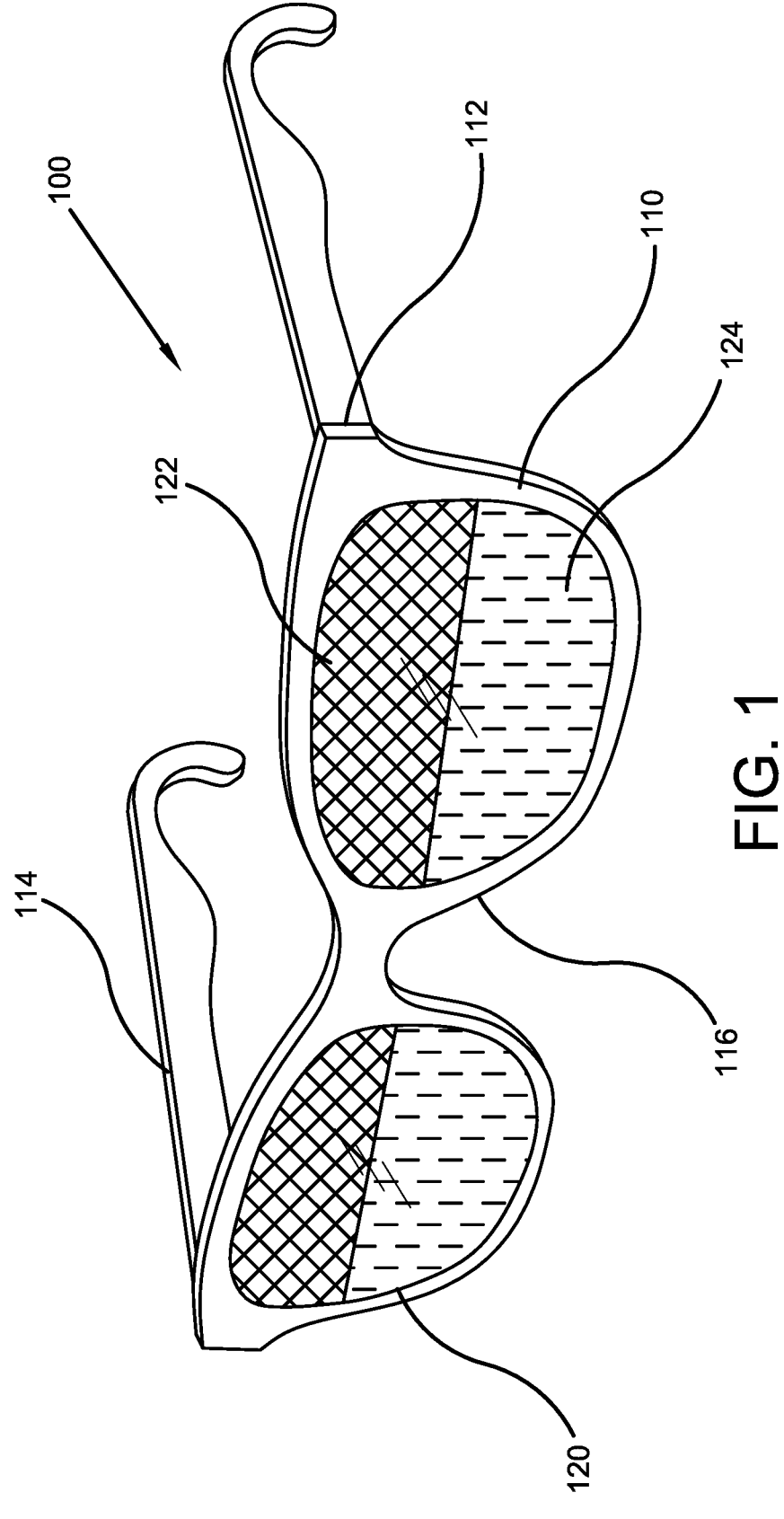
FIG. 1 illustrates a perspective view of one potential embodiment of a night-driving glasses device of the present invention with a linear lens in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that enhances visibility when faced with oncoming headlights from traffic. More specifically, there exists a long-felt need in the art for a night-driving glasses device that significantly reduces the glare of oncoming headlights or fog lights to improve visibility on roadways. Furthermore, there exists a long-felt need in the art for a night-driving glasses device that significantly reduces the glare of oncoming headlights or fog lights to improve visibility on roadways by using tints with an attenuation gradient to shield a user from oncoming bright lights. Moreover, there exists a long-felt need in the art for a night-driving glasses device that significantly reduces the glare of oncoming headlights or fog lights to improve visibility on roadways by using tints with an attenuation gradient to shield a user from oncoming bright lights and areas without tint to provide clear viewing of roadways, signs, lines, and other safety features.

The present invention, in one exemplary embodiment, is comprised of a night-driving glasses device. The device is comprised of at least one frame that supports at least one lens. The frame allows the device to be a plurality of shapes and styles. The shapes and styles may be round, aviator, wayfarer, frameless, etc. Furthermore, the frame may be made from any material known in the art, such as, but not limited to, plastic, metal, a combination material, etc.

The device is also comprised of at least one hinge. The hinge may be any hinge known in the art, such as, but not limited to, a barrel hinge, a spring hinge, an interlocking hinge, etc. The hinge may be made from metal, plastic, or any other material known in the art. The hinge is a pivot point for at least one frame arm to fold into a frame of a device for more compact storage. In one embodiment, the device is not comprised of a hinge, and a frame arm folds into a frame via a hinge-less mechanism.

The device is comprised of at least one frame arm. The frame arm securely fits a device around a user's ears. The frame arm may be any material known in the art, such as, but not limited to, magnesium, stainless steel, plastic, etc. In one embodiment, a frame may be comprised of any material known in the art mentioned above, and the frame arm may be any other material known in the art. However, in another embodiment, a frame and the frame arm may be comprised of the same material.

Additionally, the device is comprised of a nose pad. The nose pad provides a user comfort while wearing a device and secures a device to a user's face. The nose pad may be any shape known in the art to provide optimal fitting, such as, but not limited to, D-shaped, oval, soft-wing, etc. The nose pad may also be comprised of any material known in the art, such as, but not limited to, rubber, silicon, polyvinyl, etc.

Moreover, the device is comprised of at least one lens. The lens may be comprised of a first area, a second area, and a third area. The areas are comprised of varying degrees of tint to optimize the viewing of bright lights and roadway structures. The lens may be comprised of a grey, a green, a brown, a yellow, a blue, or any other tint known in the art. Furthermore, the lens may be comprised of a tint category, wherein the lower the category number, the less tinted the lens is. The lens may also be polarized or non-polarized.

In one embodiment of a device, the lens is only comprised of a first area. In this embodiment, the lens is tinted with a single color and category without a tint gradient. The lens may be used to reduce the brightness, reflection, or glare of oncoming traffic headlights.

In another embodiment, the lens is comprised of a first area and a second area. The first area of a lens may be comprised of a darker tint that reduces the bright lights of oncoming traffic. The first area may also be any darker tint category, such as, but not limited to, category 4. The second area may be comprised of a lighter tint that provides optimal viewing of roadway structures and signs. The second area tint may be a lighter tint category, such as, but not limited to, category 1. In one embodiment of the lens, wherein the lens has a first area and second area, there may be a linear gradient between the darker and lighter tint. The gradient may be sharp or gradual and may extend horizontally, vertically, or diagonally across the lens. In another embodiment of said lens, the gradient may be non-linear. In either embodiment, the darker and lighter tints may be on any side of the lens to provide optimal viewing.

In another embodiment, the lens is comprised of a first area, a second area, and a third area. In this embodiment, the first area may be a dark tint to reduce the brightness of a traffic headlight. The second area may be an intermediate tint needed to see roadway structures. The third area may be the lightest tint or no tint to accommodate situations when a clear view is needed. Additionally, the gradients between the tints may be gradual or sharp to optimize visibility.

The present invention is also comprised of a method of using the device. First, a device is provided comprised of at least one frame arm, a frame, and at least one lens with a first area and a second area. Then, a user puts a device over their eyes while in a vehicle. Next, a user drives said vehicle while wearing a device. Then, while approaching oncoming traffic with bright lights, a user looks through the first area of a lens to reduce the brightness of said lights. Then, when looking at roadways, lines, signs, etc., a user looks through the second area, for a less tinted view.

The present invention is also comprised of a second method of using the device. First, a device is provided comprised of at least one frame arm, a frame, and at least one lens with a first area, second area, and third area. Then, a user puts a device over their eyes while in a vehicle. Next, a user drives said vehicle while wearing a device. Then, while approaching oncoming traffic with bright lights, a user looks through the first area of a lens to reduce the brightness of said lights. Then, when looking at a road needing intermediate tinting, a user looks through the second area. Then, when needing a clear view of roadways, lines, signs, etc., a user looks through the third area.

Accordingly, the night-driving glasses device of the present invention is particularly advantageous as it increases user visibility while operating, driving, or riding in any vehicle known in the art. Additionally, the night-driving glasses device applies varying degrees of tint to reduce the intensity, reflection, and glare of oncoming lights to improve visibility. Moreover, the device comprises multiple lens areas to accommodate optimal visibility when faced with bright lights or when needing a clear view of roadways, signs, lines, and other road safety features. In this manner, the night-driving glasses device provides a solution for driving at night.

Referring initially to the drawings, FIG. 1 illustrates a perspective view of one embodiment of the night-driving glasses device 100. The device 100 is comprised of at least one glasses frame 110 with at least one lens 120. The frame 110 may be made from any material known in the art, such as, but not limited to, magnesium, beryllium, titanium, aluminum, ticral, stainless steel, nickel-titanium, plastic, gliamide, a combination material, etc. Furthermore, the frame 110 may be a plurality of shapes and styles. The frame 110 may be square, rectangle, round, cat-eye, aviator, browline, geometric, oversized, clip-on, full-frame, half-frame, frameless, etc., or any other style known in the art.

Additionally, the device 100 is comprised of at least one hinge 112. The hinge 112 acts as a pivot point to allow at least one frame arm 114 to fold to make the device 100 more compact when not in use. The hinge 112 may be any hinge known in the art, such as, but not limited to, a barrel hinge, a spring hinge, an interlocking hinge, etc. Moreover, the hinge 112 may be made from any material known in the art, such as, but not limited to, stainless steel, plastic, etc. In one embodiment, at least one frame arm 114 folds into at least one frame 110 via at least one hinge 112. However, in another embodiment, a frame arm 114 is connected to a frame 110 via a hingeless mechanism, and in said embodiment, the device 100 is not comprised of a hinge 112.

The night-driving glasses device 100 is also comprised of at least one frame arm 114. The frame arm 114 secures the device 100 around or on top of a user's ears. The frame arm 114 may be made from any material known in the art, such as, but not limited to, magnesium, beryllium, titanium, aluminum, ticral, stainless steel, nickel-titanium, plastic, gliamide, a combination material, etc. In one embodiment, the frame 110 and the frame arm 114 are made from the same material. In another embodiment, the frame 110 may be made from any of the said materials, while the frame arm 114 may be made from any differing material mentioned above.

Moreover, the device 100 is comprised of at least one nose pad 116. The nose pad 116 keeps the device 100 in place on a user's face and enhances said user's comfort while wearing the device 100. The nose pad 116 may be any shape that enhances a user's experience wearing the device, such as, but not limited to, D-shaped, oval, round, button, teardrop, soft-wing, saddle-bridge, strap-bridge, etc. Additionally, the nose pad 116 may be any material known in the art, such as, but not limited to, silicon, rubber, polycarbonate, polyvinyl, etc.

The device 100 is further comprised of at least one lens 120 attached to the frame 110. In different embodiments, the lens 120 may be comprised of different combinations of a first area 122, a second area 124, and a third area 126 that each has varying degrees of tints to accommodate enhanced visibility when a user is faced with bright lights or road safety features. However, the device 100 has at least one a first area 122 and a second area 124.

At least one lens area 122, 124, 126 may be comprised of any tint color known in the art, such as, but not limited to, grey, green, brown, yellow, blue, red, mirror, amber, etc. Additionally, the lens 120 may be comprised of any tint category known in the art, such as category 0 tint, category 1 tint, category 2 tint, category 3 tint, category 4 tint, etc., wherein category 0 is the lightest tint and category 4 is the darkest tint, to optimally enhance a user's visibility. Furthermore, the lens area 122, 124, 126 may be non-polarized or polarized. A tinted lens area 122, 124, 126 provides an area for a user to look through while faced with bright headlights or glare, to reduce their effects.

In one embodiment, the lens 120 of a device 100 is only comprised of a first area 122. In said embodiment, the first area 122 may be fully tinted with a single tint color and category without a gradient in the tint. In this embodiment, the lens 120 may be used to reduce the bright white light, blue light, reflection, or glare of oncoming traffic lights.

In another embodiment, the lens 120 is comprised of a first area 122 and a second area 124. In said embodiment, the first area 120 may be comprised of a darker tint category, such as, but not limited to, category 3 or 4, to reduce the bright white light, blue light, reflection, or glare of oncoming traffic lights. The second area 124 may be comprised of a lighter tint category, such as, but not limited to, category 0 or 1, or no tint to provide clear viewing of roadways, signs, lines, and other safety features.

Figure 2:
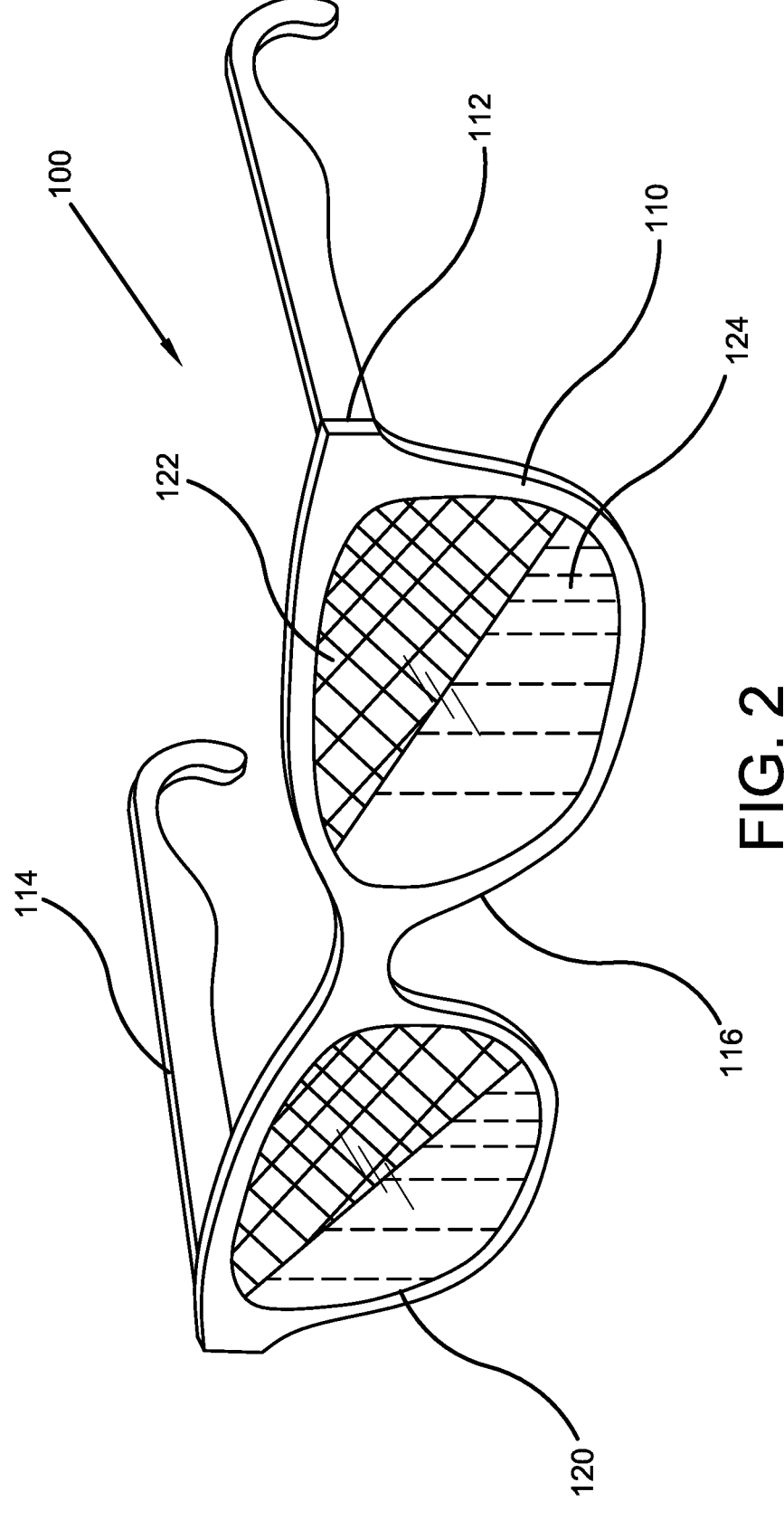
FIG. 2 illustrates a perspective view of one potential embodiment of a night-driving glasses device of the present invention with a linear lens in accordance with the disclosed architecture.

In one embodiment, wherein the lens 120 is comprised of a first area 122 and a second area 124, there may be a linear gradient across the lens 120 to provide a transition from the darker tint category to the lighter tint category. The linear gradient may be sharp or gradual, extending vertically, horizontally, or diagonally across the lens 120, as seen in FIG. 2.

Figure 3:
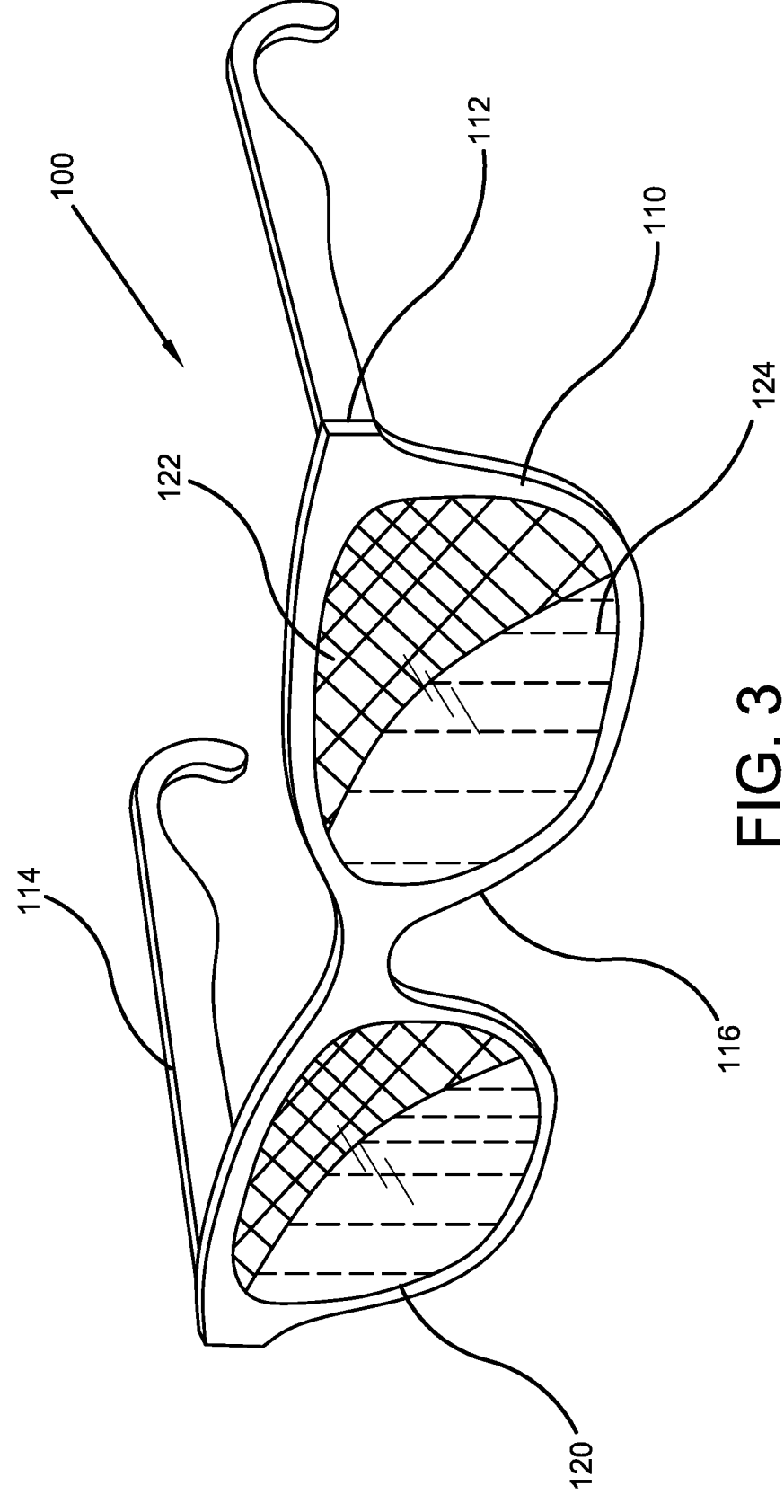
FIG. 3 illustrates a perspective view of one potential embodiment of a night-driving glasses device of the present invention with a non-linear lens in accordance with the disclosed architecture.

In another embodiment, wherein the lens 120 is comprised of a first area 122 and a second area 124, there may be a non-linear gradient across the lens, as seen in FIG. 3. The non-linear gradient serves the same purpose as the liner gradient mentioned above. Furthermore, the darker and lighter tint categories can be distributed on any side of the lens, in varying embodiments, to provide optimal bright light reduction and clear viewing.

Figure 4:
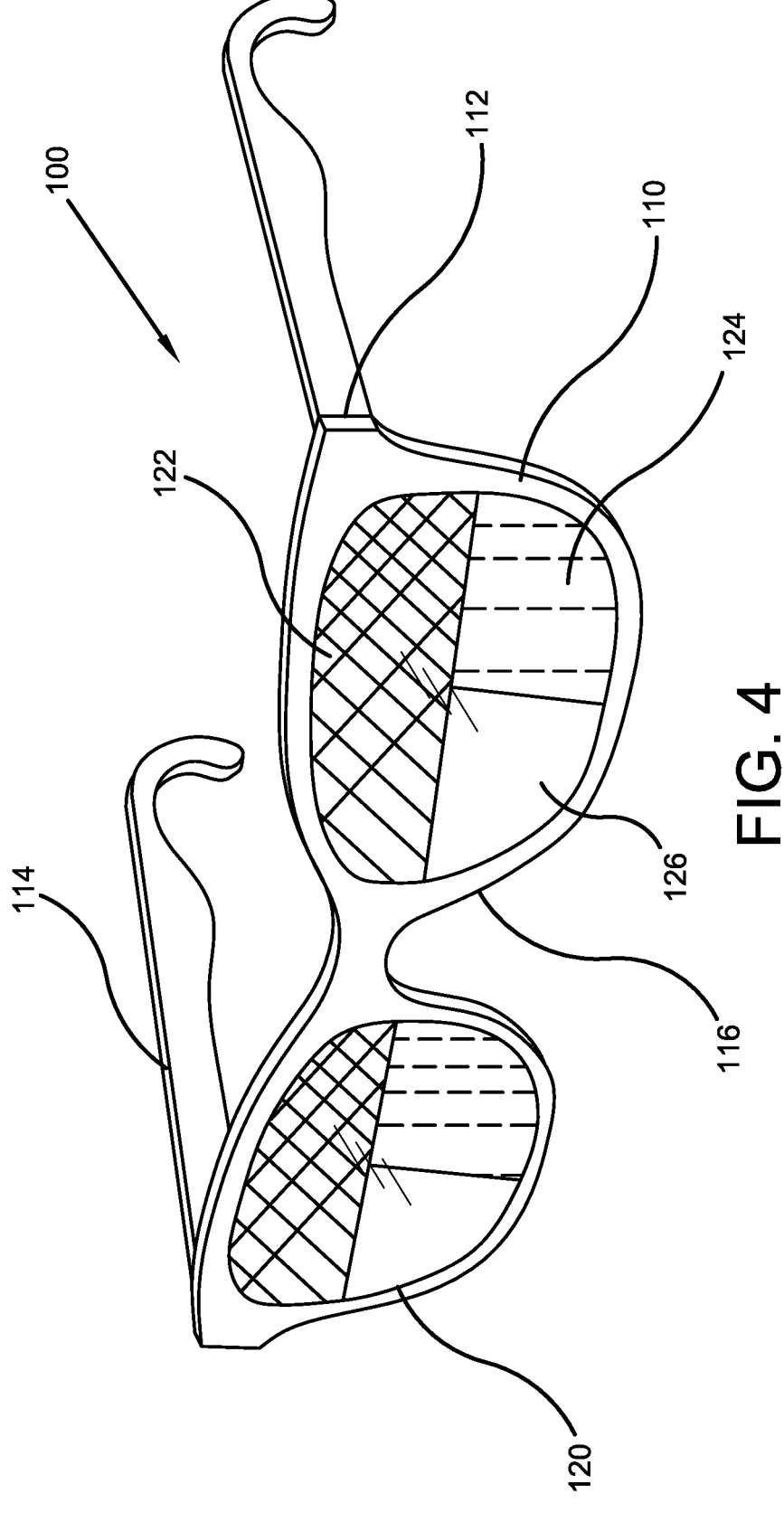
FIG. 4 illustrates a perspective view of one potential embodiment of a night-driving glasses device of the present invention with a multi-section lens in accordance with the disclosed architecture.
Figure 5:
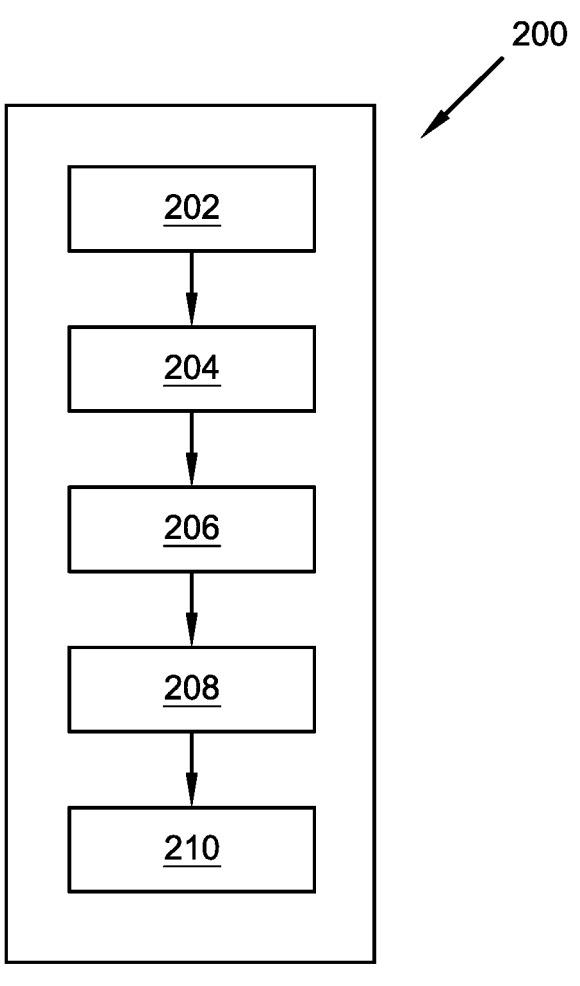
FIG. 5 illustrates a flowchart of a method of using one potential embodiment of a night-driving glasses device of the present invention in accordance with the disclosed architecture.
Figure 6:
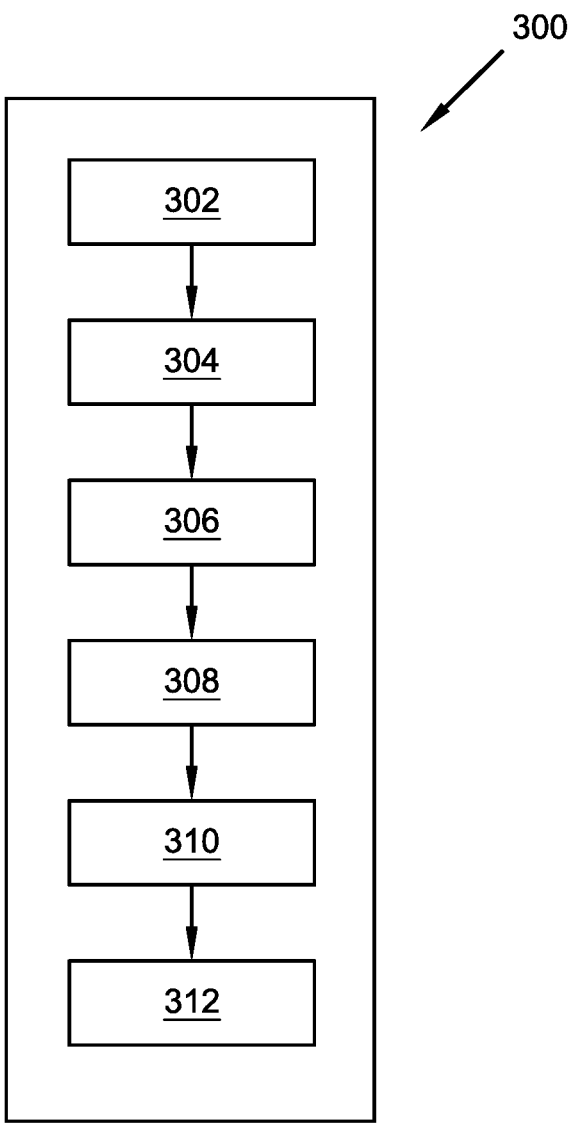
FIG. 6 illustrates a flowchart of a method of using one potential embodiment of a night-driving glasses device of the present invention in accordance with the disclosed architecture.

In another embodiment, the lens 120 is comprised of a first area 122, a second area 124, and a third area 126, as seen in FIG. 4. In said embodiment, the first area 122 may be the darkest tint category, such as, but not limited to, category 3 of 4, the second area 124 may be an intermediate tint category, such as, but not limited to, 1 or 2, and the third area may be a light tint category, such as, but not limited to, 0, or no tint (i.e., transparent). In said embodiment, the gradient between tint categories may be sharp or gradual, allowing optimal visibility from the device 100.

The present invention is also comprised of a method of using 200 the device 100. First, a device 100 is provided comprised of at least one frame arm 114, a frame 110, and at least one lens 120 with a first area 122 and a second area 124 [Step 202]. Then, a user puts the device 100 over their eyes while in a vehicle [Step 204]. Next, a user drives said vehicle while wearing the device 100 [Step 206]. Then, while approaching oncoming traffic with bright vehicle lights (ex. headlights), a user looks through the first area 122 of a lens 120 to reduce the brightness of said lights [Step 208]. Then, when the vehicle has passed (and while otherwise driving) a user can look at roadways, lines, signs, etc., through the second area 124, for a less tinted view [Step 210].

The present invention is also comprised of a second method of using 300 the device 100. First, a device 100 is provided comprised of at least one frame arm 114, a frame 110, and at least one lens 120 with a first area 122 of a first tint, second area 124 of a second tint, and third area 126 [Step 302]. Then, a user puts the device 100 over their eyes while in a vehicle [Step 304]. Next, a user drives said vehicle while wearing the device 100 [Step 306]. Then, while approaching oncoming traffic with bright vehicle lights (ex. headlights), a user looks through the first area 122 of a lens 120 to reduce the brightness of said lights [Step 308]. Then, when looking at a road needing intermediate tinting (i.e., when more vehicles are approaching), a user looks through the second area 124 [Step 310]. Then, when needing a clear view of roadways, lines, signs, etc., (or otherwise driving with no oncoming vehicles nearby) a user looks through the third area 126 [Step 312].

It should be appreciated that different embodiments of the lens 120 may have any combination of lens area 122, 124, 126 tint colors, styles, and types, in combination with any transparent lens area 122, 124, 126. In addition, said areas 122, 124, 126 may be divided on the lens 120 in any pattern, arrangement, shape, style, etc.

Certain terms are used throughout the following description and claims to refer to particular features or components. As one skilled in the art will appreciate, different persons, may refer to the same feature or component by different names. This document does not intend to distinguish between components or features that differ in name but not structure or function. As used herein "night-driving glasses device" and "device" are interchangeable and refer to the night-driving glasses device 100 of the present invention.

Notwithstanding the foregoing, the night-driving glasses device 100 of the present invention and its various components can be of any suitable size and configuration as is known in the art without affecting the overall concept of the invention, provided that they accomplish the above-stated objectives. One of ordinary skill in the art will appreciate the size, configuration, and material of the night-driving glasses device 100 as shown in the FIGS. are for illustrative purposes only, and that many other sizes and shapes of the night-driving glasses device 100 are well within the scope of the present disclosure. Although the dimensions of the night-driving glasses device 100 are important design parameters for user convenience, the night-driving glasses device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A night-driving glasses device comprising:
a glasses frame comprising a silicon teardrop nose pad;
a lens attached to the frame, the lens comprised of a first area and a second area; wherein the first area and the second area are separated by a linear diagonally extending gradient of tint.

2. A night-driving glasses device of claim 1, wherein the first area is comprised of a first tint color.

3. A night-driving glasses device of claim 1, wherein the second area is comprised of a second tint color.

4. A night-driving glasses device of claim 1, wherein the first area is comprised of a first tint category and the second area is comprised of a second tint category.

5. A night-driving glasses device of claim 4, wherein the first tint category is darker than the second tint category.

6. A night-driving glasses device of claim 1, wherein the first area is polarized.

7. A night-driving glasses device of claim 1, wherein the second area is non-polarized.

8. A night-driving glasses device of claim 1, wherein the second area is comprised of a transparent area.

9. A night-driving glasses device comprising:
a glasses frame comprising a rubber saddle-bridge nose pad;
a lens attached to the frame, the lens comprised of a first area, a second area, and a third area; wherein the first area and the second area are separated by a non-linear gradient of tint.

10. A night-driving glasses device of claim 9, wherein the first area is comprised of a first tint color.

11. A night-driving glasses device of claim 9, wherein the second area is comprised of a second tint color.

12. A night-driving glasses device of claim 9, wherein the first area is comprised of a first tint category and the second area is comprised of a second tint category.

13. A night-driving glasses device of claim 12, wherein the first tint category is darker than the second tint category.

14. A night-driving glasses device of claim 9, wherein the first area is polarized.

15. A night-driving glasses device of claim 9, wherein the second area is non-polarized.

16. A night-driving glasses device of claim 9, wherein the third area is transparent.

17. A method of using a night-driving glasses device, the method comprising the following steps:
providing a night-driving glasses device comprised of a frame with a lens comprised of a first area, a second area, and a polycarbonate strap-bridge nose pad;
driving a vehicle while wearing the night-driving glasses device;
looking through the first area when an oncoming vehicle with headlights on approaches the vehicle; and
looking through the second area after the oncoming vehicle with headlights on has passed the vehicle; wherein the first area and the second area are separated by a vertically extending gradient of tint on the lens.

18. A method of using a night-driving glasses device of claim 17 further comprised of a step of looking through a third area of the lens.

* * * * *